United States Patent [19]

Bücheler

[11] Patent Number: 4,629,411
[45] Date of Patent: Dec. 16, 1986

[54] APPARATUS FOR THE SEPARATION OF ADMIXTURES FROM CONTAMINATED THERMOPLASTIC MATERIALS

[76] Inventor: Eberhard Bücheler, Am Bord 1, Radolfzell 17, Fed. Rep. of Germany, 7760

[21] Appl. No.: 621,466

[22] Filed: Jun. 18, 1984

[30] Foreign Application Priority Data

Sep. 7, 1983 [DE] Fed. Rep. of Germany ....... 3332278

[51] Int. Cl.[4] ............................................. B29C 47/68
[52] U.S. Cl. ...................................... 425/197; 210/414;
210/415; 210/791; 264/37; 366/87; 425/199
[58] Field of Search .................. 264/37, 38, 141, 349,
264/140; 425/1, 197, 199, 198, 376 B, 203, 376
R; 366/79, 87; 210/791, 408, 409, 411, 413, 414,
415, 404

[56] References Cited

U.S. PATENT DOCUMENTS

| 1,429,707 | 9/1922 | Baker | 209/270 |
|---|---|---|---|
| 3,020,592 | 2/1962 | Maccaferri | 425/197 |
| 4,085,050 | 4/1978 | Gervasi | 210/414 |
| 4,174,198 | 11/1979 | Kinoshita | 425/197 |
| 4,177,234 | 12/1979 | Lowry | 264/141 |
| 4,280,907 | 7/1981 | Häberle | 425/197 |
| 4,332,541 | 6/1982 | Anders | 425/197 |
| 4,529,509 | 7/1985 | Nilsson | 210/408 |

FOREIGN PATENT DOCUMENTS

| 1554886 | 4/1965 | Fed. Rep. of Germany . | |
| 2006941 | 8/1971 | Fed. Rep. of Germany | 425/197 |
| 3332278 | 4/1986 | Fed. Rep. of Germany . | |
| 57189 | 4/1965 | German Democratic Rep. . | |
| 988907 | 1/1983 | U.S.S.R. | 425/197 |

Primary Examiner—Jay H. Woo
Assistant Examiner—J. Fortenberry
Attorney, Agent, or Firm—Lilling & Greenspan

[57] ABSTRACT

Apparatus is disclosed for the separation of admixtures from contaminated thermoplastic materials. The apparatus has a distributor screw, a retainer chamber and return flow holes for contaminated materials to pass from the retainer chamber into an annular space formed between the distributor screw and the screening element within the pressure chamber. The materials circularly travel around saw-like teeth of the distributor screw and back through the flow holes into the retaining chamber. The retainer chamber and the annular space are openly connected to each other at the inlet side of the pressure chamber. Purified materials exit through one outlet exit and admixtures exit through a second exit.

9 Claims, 1 Drawing Figure

APPARATUS FOR THE SEPARATION OF ADMIXTURES FROM CONTAMINATED THERMOPLASTIC MATERIALS

FIELD OF THE INVENTION

The invention relates to an operating procedure and device for the separation of thermoplastic materials contaminated by metallic and/or nonmetallic admixtures.

Large quantities of such plastic materials are involved in the reprocessing of packaging materials, e.g. yoghurt cups, packaging foils, carrying bags, in the startup of production of coated materials, scrap materials, etc.

BACKGROUND OF THE INVENTION

In the processes and equipment known to date, the thermoplastic material contaminated by admixtures was heated and squeezed through a screen by means of a piston. Other methods are known also. The disadvantage of all of these methods is always that it is difficult to transport the admixtures away. The material to be processed must be subjected to pressure and heat but its viscosity is high, and in the course of the reprocessing the percentage of admixtures becomes greater and greater and the percentage of the thinly liquid material smaller and smaller, which necessitates higher and higher processing pressures. This results in much wear of the machinery, e.g. of the screens and the pistons, and the process itself becomes rather uneconomical because it cannot be carried out continuously as screens have to be cleaned constantly, admixtures removed separately, causing long processing interruptions. Accordingly, the known methods with their equipment are not very economical overall because the equipment wears quickly, is subject to very high compressive stresses and, in relation to the material to be reprocessed, the yield is not high enough, i.e. the contaminations to be discarded still contain a relatively large amount of usable material.

SUMMARY OF THE INVENTION

It is an object of the invention to remedy this situation and to organize the process so that a heretofore impossible degree of purity is reached at a savings of labor cost and in a shorter time with machinery operating more economically which is less expensive to produce.

According to the invention, the problem, namely the separation of thermoplastic materials contaminated by metallic and/or nonmetallic admixtures is solved by the following procedural steps:
1. The contaminated plastic material is plastified in an extruder and conveyed to a pressure chamber. Subsequently, in the pressure chamber, the plastified material is transported past the screen holes perpendicularly to the latter's centerlines and is divided into purified plastic material discharged through the screen holes and into admixtures to be transported further.
2. Finally, care is taken at the end of the pressure chamber to ensure that the accumulating admixtures are compressed and removed in time intervals.

Accordingly, a completely new avenue is pursued here, in which two material flows are present, namely one flow of purified material and one flow of admixtures ultimately flowing in a different direction.

It is essential for this operating procedure that the plastified material in the pressure chamber is fed continuously by pressure to screen holes until it gets to an outlet.

These screen holes see to it that the material can yet be transported to a retaining chamber and that this material, moving in circulation, passes through the screen section several times.

This is where the great work savings and the much more economical significance of the process lie. None of the known processes provide for a return flow. But this new process provides for a return flow along a purification section, and at the end of the purification section the percentage of thermoplastic material in relation to the admixtures is very small, whereas it is much greater at the start of this purification section.

This continuous operating procedure along a purification section results in a much greater yield at a much lower labor cost. Due to the fact that the direction in which the admixtures are removed is perpendicular to the discharge direction of the recovered thermoplastic material, these two flows do not hinder each other, and a degree of purification not known heretofore is attained in the recovery of thermoplastic materials.

One preferred embodiment consists in that the plastified material, while being fed to the screen holes in the pressure chamber, moving in circulation additionally passes through the screen section repeatedly.

One purposeful embodiment of the process consists in that the material, entering the pressure chamber from the extruder, is divided into two incoming flows, one of which reaches the screen holes directly and the other travels to the screen holes via a retaining chamber.

What is achieved by these measures is that there is always a certain equilibrium or a certain pressure equalization. Depending on the flow resistance, the material fed in has the possibility to reach the screen holes either via a retaining chamber or directly. This, in turn, results in stressing the conveying device much less because the pressures equalize themselves according to the flow resistances. Due to such a retaining chamber a pressure equalization of the various branch flows in front of the screen holes takes place in such a manner that, if the pressure builds up out of proportion at the end of the pressure chamber, for instance, holes for a return flow are provided, as it were, and that the pressure then equilizes so that the material flows to wherever a lesser pressure prevails. Consequently, approximately the same pressure acting upon the screen holes prevails during the entire operating procedure, regardless of whether they are at the beginning or at the end of the pressure chamber.

The admixtures, always being transported perpendicularly to the centerlines of the screen holes, are then compressed at the end of the pressure chamber and can be removed periodically by opening a drain valve.

One embodiment example for the implementation of the operating procedure consists in that a distributor screw is disposed in the pressure chamber and the pressure chamber wall has screen holes.

To provide favorable flow conditions it is important for the pressure chamber wall to taper down towards the outlet. The screen holes are also designed so as to widen conically towards their outlet.

It is important that the distributor screw has a sawtooth cutting profile and that return flow holes are present at the tooth root.

The cutting profile cuts away from the wall containing the screen holes material remaining their and transports it further so that the screen holes are kept open at all times. If, due to this cutting action, a higher pressure builds up within the teeth, return flow holes are provided at the tooth root which effects pressure relief, i.e. care is always taken that very little space remains between the cutting profile and the feed-in opening of the screen hole. Therefore, no admixtures whatever can clog up the screen holes because they are always being cut away.

DETAILED DESCRIPTION OF THE DRAWINGS

Figures 1, 1A:
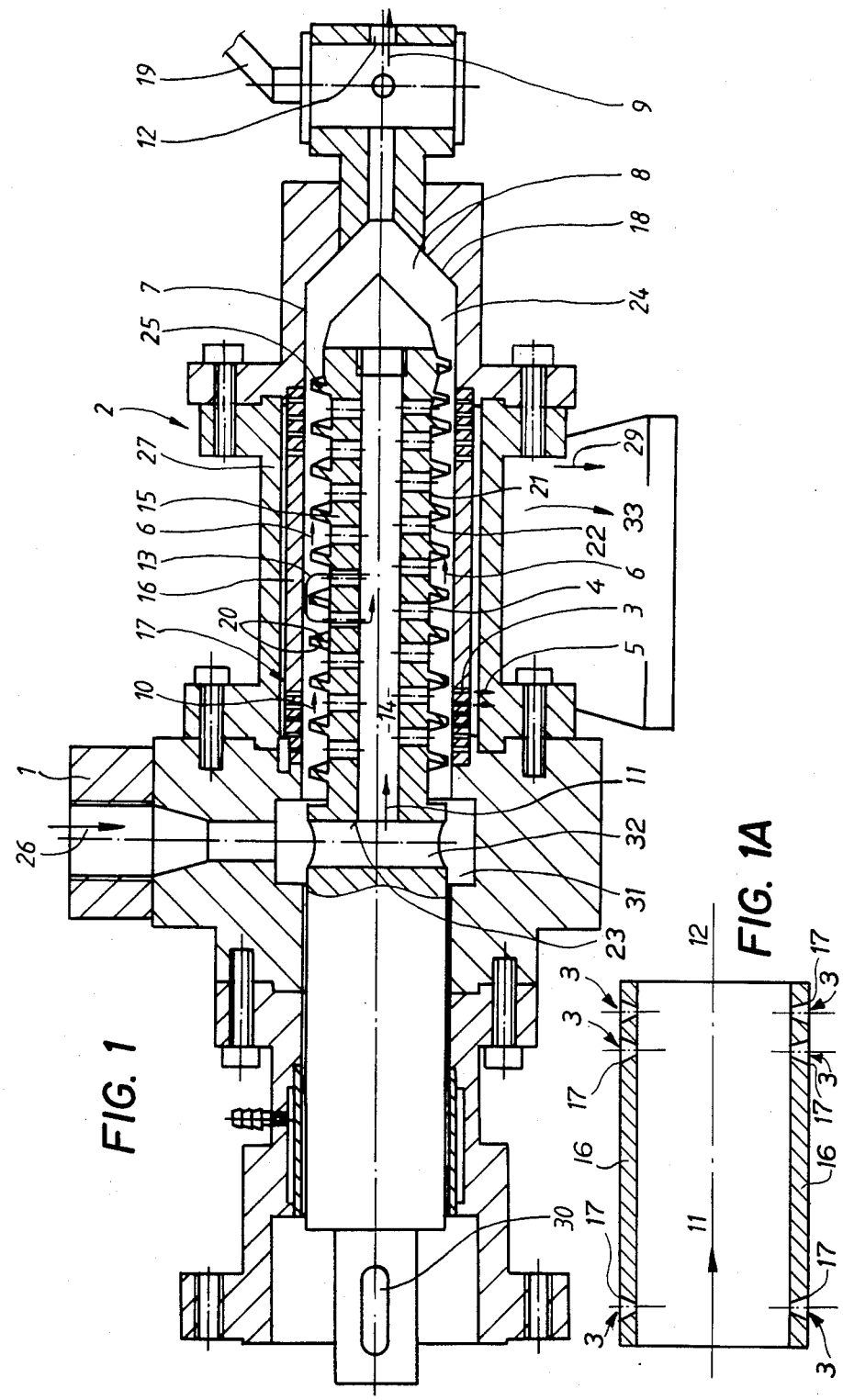
FIG. 1 is a cross-sectional view of the inventive apparatus.
FIG. 1A is a cross-sectional view illustrating the tapered wall of the pressure chamber.

The drawing shows the discharge end of an extruder 1. The extruder presses already plastified material to be processed into the equipment in arrow direction 26. This material, arriving in arrow direction 26, can distribute in the pressure chamber in accordance with the pressure conditions, flowing either in arrow direction 11 into a retaining chamber 14, of the distributor screw 15, or else in arrow direction 10 along a tapered wall 16 which is enclosed by the wall 27 of the pressure chamber 2. The material arriving in arrow directions 11 and 10 after passing the screen holes 3 is purified and reaches in arrow direction 29 either a collecting chamber or is drained directly there in order to be conveyed for further processing. This means that this equipment can be installed directly in the work cycle of other production machines to which thermoplastic material is supplied for processing. The admixtures ultimately move in arrow direction 6 to an outlet 12 from which they are removed in arrow direction 9.

The equipment then operates as follows:

A defined operating pressure is maintained by the extruder 1 in the pressure chamber 2 which is enclosed by the wall 27. The essential function of the distributor screw 15 is the distribution of the material fed in, there being provided in the wall 16 screen holes 3 whose centerline 4 is perpendicular to the conveying direction 6 of the admixtures. Discharging in arrow direction 5 is then the relatively thinly liquid material to be reprocessed, the arrow direction 33 indicating the entirety of all the discharging, purified material. Compressed at the end 7 of the pressure chamber, under the pressure of the extruder, are then the admixtures 8 which now consist almost exclusively of metal or the like. The distributor screw can also exert a certain pressure on these admixtures 8 because at the end of the distributor screw the percentage of admixtures of high viscosity is very much higher than that of the squeezed out thermoplastic material of very much less viscosity pushed through the screen holes. Accordingly, a certain sealing action occurs between the wall 6 and the cutting profile 20 of the distributor screw teeth.

Depending on the pressure ratio between the retaining chamber 14 and the tooth gaps of the distributor screw, circulations of the material will form in arrow direction 13. If the pressure in the retaining chamber 14 is greater than the pressure within the tooth root 21, the material will flow in arrow direction 13, get back into the area of the screen holes and is then divided there into two flows, namely, the one in arrow direction 6 for the admixtures and the other in arrow direction 5 for the discharging material.

The outlet 17 of the screen holes is widened conically in accordance with the flow conditions. This widening is needed because if any contamination gets stuck in one of the screen holes, the pressure exerted on it will clean the hole.

The contaminations themselves can be removed continuously from the outlet 12 in arrow direction 9 by opening an outlet valve 19. The size of the return flow holes 22 is commensurate with the pressure conditions. They may be uniform over the entire distributor screw, but they may also be larger towards the end. In any case, these holes can be selected so that the distributor screw is subjected to a uniform pressure over its entire length; it is even centered, as it were, because the internal and external pressure compensate each other. It is only necessary to mount the distributor screw in a support; the distributor screw is driven by a not shown transmission on its driving end 30. A collecting basin 31, filled in arrow direction 26 by the extruder 1, then takes the material through a hole 32 in the distributor screw to the inlet 23 or directly to the circumference of the distributor screw whose threads continue right into the supply tank which is not shown in the drawing.

The conical head 24 at the end of the distributor screw 15 has a thickened section 25 with which an extra compression of the admixtures 8 at the end of the pressure chamber is achieved, also preventing the admixtures from possibly flowing back again.

Applications for the invention are many where plastifying material is fed into a treatment chamber in which a conveying device is located which transports the material along and in circulation past a screen of stationary or rotating design and, most importantly, where the arrangement is such that the conveying direction of the admixtures is ultimately perpendicular to the drain of the plastified material, yet, depending on the viscosity, the admixtures are also included in the circulation in the beginning.

I claim:

1. An apparatus to separate admixtures from molten contaminated thermoplastic materials comprising:
   (a) a housing;
   (b) an extruder having a discharge flange and extending through an outside wall of said housing, said extruder plastifies said contaminated thermoplastic materials;
   (c) a pressure chamber located within said housing and having one end attached to said discharge flange of said extruder and a second end attached to a first exit outlet of the housing, said pressure chamber pressurizes said plastified contaminated thermoplastic materials as they pass through said chamber from said extruder toward said first exit outlet;
   (d) a distributor screw located inside said pressure chamber and having one end attached to said discharge flange of said extruder, said distributor screw having a central retaining chamber used to receive said contaminated thermoplastic materials from said discharge flange and a plurality of return flow holes to circulate said thermoplastic materials from said retaining chamber around said distributor screw and back into said retaining chamber, resulting in the purification of said contaminated thermoplastic materials; and (e) a screening element having a plurality of screen holes and located inside said pressure chamber around said distributor screw, and said screening element forming an annular chamber with said distributor screw, said annular chamber communicating with said retaining chamber of said distributor screw and pressing said contaminated thermoplastic materials travelling from said discharge flange of said extruder into the annular chamber to separate said admixtures from said thermoplastic materials and subsequently pass the admixtures from said annular chamber to said exit outlet, said screen holes of said screening element transporting purified thermoplastic materials from said annular chamber to a second outlet exit.

2. An apparatus according to claim 1, wherein said retaining chamber includes a bore shape and is concentrically arranged inside said distributor screw.

3. An apparatus according to claim 1, wherein said distributor screw includes an inlet opening connecting said retaining chamber with said flange outlet of said extruder.

4. An apparatus according to claim 1, wherein said distributor screw further comprises saw-like teeth arranged along a horizontal profile side and said flow holes are provided between each tooth root of said saw-like teeth.

5. An apparatus according to claim 1, wherein said second end of said pressure chamber is conically tapered and defines a drain valve.

6. An apparatus according to claim 1, wherein a second end of said distributor screw located within said second end of said pressure chamber is conically tapered.

7. An apparatus according to claim 6, wherein said distributor screw further comprises a thickened sealing section located within said distributor screw and behind said conical second end of said distributor secrew.

8. An apparatus according to claim 1, wherein a length of said screen holes is in a range of three to ten times greater than a diameter of a smallest screen hole.

9. An apparatus according to claim 8, wherein said screen holes taper conically in a direction toward said second exit outlet.

* * * * *